United States Patent
Tan

(10) Patent No.: US 6,232,354 B1
(45) Date of Patent: May 15, 2001

(54) MICROCELLULAR POLYMER FOAMS AND METHOD FOR THEIR PRODUCTION

(76) Inventor: Seng C. Tan, 3591 Apple Grove Dr., Beavercreek, OH (US) 45430

( * ) Notice: Subject to any disclaimer, the term of this patent is extended or adjusted under 35 U.S.C. 154(b) by 0 days.

(21) Appl. No.: 09/236,179

(22) Filed: Jan. 25, 1999

(51) Int. Cl.[7] .................................................. C08J 9/18
(52) U.S. Cl. ................... 521/60; 521/82; 264/51
(58) Field of Search ........................ 521/60, 82; 264/51

(56) References Cited

U.S. PATENT DOCUMENTS

| | | | |
|---|---|---|---|
| 5,340,841 | * | 8/1994 | Tokoro et al. ........................ 521/60 |
| 5,391,581 | * | 2/1995 | Kuwabara et al. .................... 521/60 |
| 5,424,336 | * | 6/1995 | Taniguchi ............................ 521/60 |
| 5,830,922 | * | 11/1998 | Wirobski et al. ..................... 521/60 |
| 5,917,011 | * | 6/1999 | Duda et al. .......................... 521/60 |

* cited by examiner

Primary Examiner—John M. Cooney, Jr.

(57) ABSTRACT

An environmentally friendly, commercially practicable process for the production of microcellular polymer foams from amorphous, semi-crystalline and crystalline polymers that comprises consolidating the polymer into a polymer shape, saturating the polymer shape with an inert gas at elevated temperature, above the $T_g$ of the polymer, and under elevated pressure, releasing the pressure and cooling, i.e. quenching, the saturated polymer polymer shape under controlled temperature and pressure conditions to produce either a closed or open celled, low to medium density microcellular foam or a closed cell, high density microcellular foam.

15 Claims, 4 Drawing Sheets

----- 100Microns

MICROCELLULAR POLYMER FOAMS AND METHOD FOR THEIR PRODUCTION

FIELD OF THE INVENTION

The present invention relates to microcellular polymer foams and methods for their production and more specifically to microcellular crystalline and semi-crystalline polymer foams produced by a similar method. Filled polymer foams and methods for their manufacture are also described.

BACKGROUND OF THE INVENTION

The production of polymeric foams is well known in the art. For example, foams of amorphous polymers such as polystyrene have been manufactured for decades. Most commercial foam production processes involve the use of chemical blowing agents (CBAs) which decompose during processing or blowing gases like CFCs or carbon monoxide, which are toxic or polluting. Such foaming techniques generally produce foams whose cell sizes are on the order of millimeters and have mechanical properties much weaker than those of the solid form of the parent polymer material.

Structural foams have more recently been processed from polymers such as polymethacrylic imide and polyvinyl urea-amides. The production of such foams poses several problems. In the case of the former material, for example, the foam is manufactured by hot foaming methacrylic acid and methacrylonitrile monomers using carbon monoxide, a toxin, as the blowing agent. Additionally, such foams remain "macrocellular" and do not demonstrate mechanical properties anywhere near those of the parent polymer material.

To overcome the mechanical property deficiencies of macrocellular foams, the production of microcellular foams has been proposed. In these cases, microcellular foams were defined as having cell sizes on the order of tens of microns and cell densities on the order of $10^8$–$10^9$/cc. Such a process was developed for the production of amorphous polymeric foams. This process involved saturation of the polymer sample with a non-reactive gas such as nitrogen at elevated pressure and a temperature below the $T_g$ (glass transition temperature) of the polymer. The pressure was then released and the temperature raised above the $T_g$ of the polymer. These techniques required soaking times on the order of 24 hours to allow the gas to dissolve in the polymer. These efforts to produce microcellular foams have been conducted primarily with amorphous polymers, although some more recent efforts have been made to use the process to foam semi-crystalline polymers such as PET.

High temperature polymers such as liquid crystalline polymers (LCPs) are more difficult to foam. In fact, to our knowledge, there are currently no LCP foams available because of the lack of a high temperature blowing agent as required by conventional "blowing" or foam manufacturing techniques.

OBJECTS OF THE INVENTION

It is therefore an object of the present invention to provide an environmentally friendly process for the production of microcellular foams.

It is another object of the present invention to provide a commercially practicable process for the production of microcellular foams.

It is yet another object of the present invention to provide a process for the manufacture of microcellular foams from crystalline and semi-crystalline polymers.

Still a further object of the present invention is to provide a method for the so-called "loaded" or filled microcellular foams, which have been reinforced with particulate or fibrous material to enhance their mechanical, electrical, thermal, etc. properties.

SUMMARY OF THE INVENTION

The present invention provides an environmentally friendly and commercially practicable process for the production of microcellular polymer foams from amorphous, semi-crystalline and crystalline polymers which involves consolidating the polymer, saturating the polymer with an inert gas at elevated temperature and under elevated pressure, and cooling, i.e. quenching the saturated polymer under a variety of temperature and pressure conditions to produce either a closed or open celled microcellular foam or a high density microcellular foam, as defined hereinafter. Microcellular foams of amorphous, semi-crystalline and crystalline polymers that demonstrate unusually high mechanical properties can be made using the techniques of the present invention and are also described. Additionally the manufacturing processes described herein are equally applicable to the production of reinforced or filled microcellular polymer foam materials, which demonstrate exceptional mechanical, electrical or other properties.

DETAILED DESCRIPTION OF THE INVENTION

Figure 1:
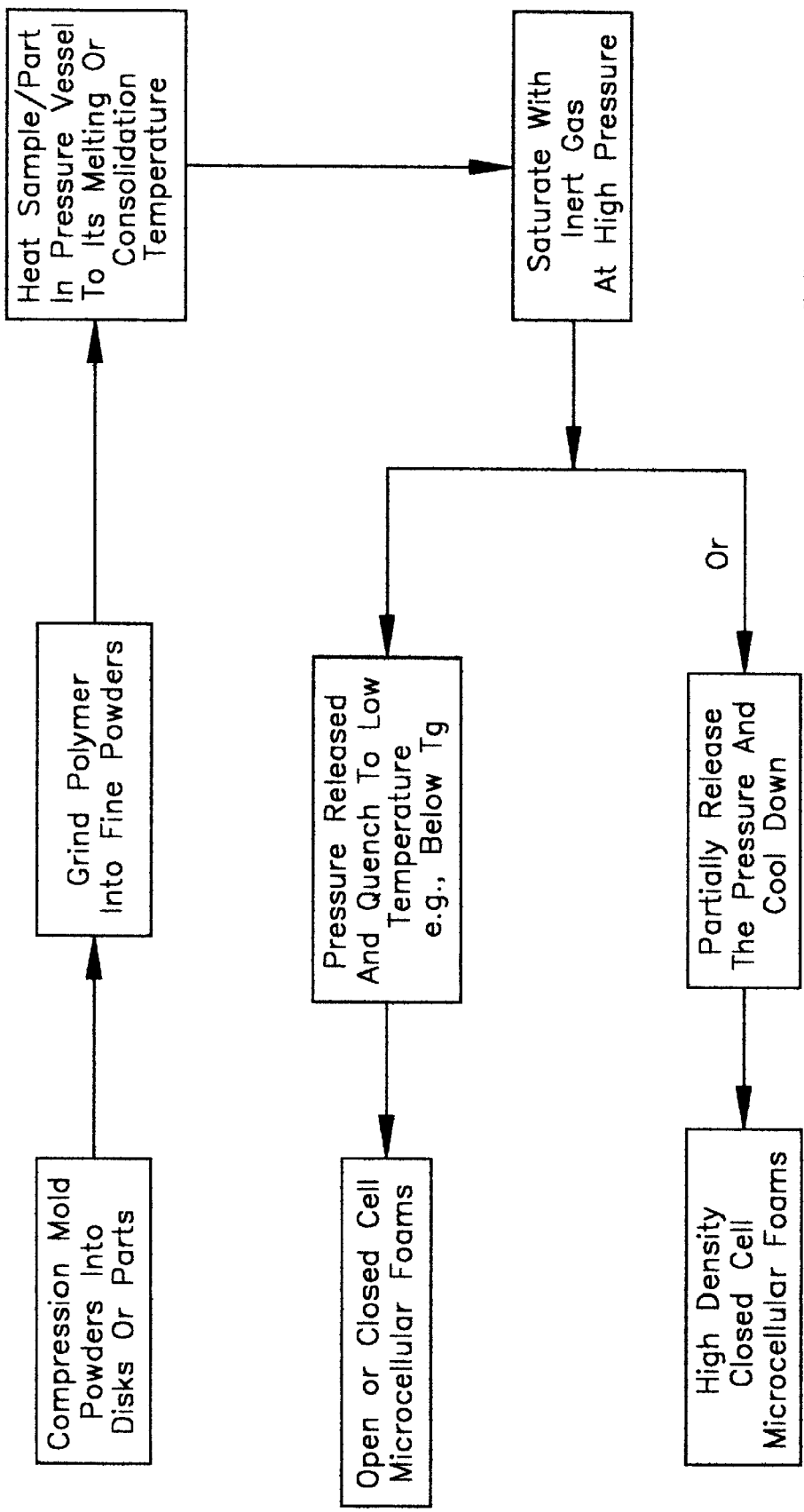
FIG. 1 is a block flow diagram of the foam production process of the present invention.

As shown in FIG. 1, the process of the present invention comprises: 1) securing an appropriate amorphous, crystalline or semi-crystalline polymer, filled or not, in powdered form; 2) forming the powdered polymer, including any filler material, if included, into an appropriate shape by compression molding, injection molding or otherwise, if the polymer is supplied in powdered form; 3) consolidating the shape at elevated temperature; 4) saturating the polymer shape with an inert gas at elevated temperature above the $T_g$ of the polymer and under elevated pressure; and then quenching the polymer shape by either: A) cooling the polymer shape to a lower temperature above the $T_g$ of the polymer while maintaining pressure and subsequently quickly releasing the pressure and quenching to ambient; or B) partially reducing the pressure and cooling the shape to a temperature below the $T_g$ of the polymer prior to completely reducing the pressure and temperature to ambient. In the case of optional process step A, the foam produced will be a low density closed or open cell microcellular foam, while in the case of optional process step B, the foam produced will be a high density closed cell microcellular foam. For purposes of this invention, "microcellular foams" are characterized by cell diameters between about 1 and about 100 µm and cell densities of from about $10^9$ to about $10^{12}$ cells/cc. "High density microcellular foams" are characterized by porosities of less than 50% while "Low density microcellular foams" are characterized by porosities generally over about 85%.

In any of the processes described herein, the presence of a "loading" or "filling" agent or "filler" of the type described below does not affect the ability of the process to produce an acceptable, and in many cases exceptional, reinforced microcellular foam. Consequently when used herein, the terms "polymer" "polymer shape" etc. are intended to include polymeric compositions which include one or more "loading" or "filling" agents. Acceptable filling agents include, but are not limited to such materials as chopped glass fibers, carbon, metallic and aramid fibers, minerals such as calcium carbonate powder and ceramic whiskers and fibers. So long as the filler material is capable of withstanding the operating temperatures and pressures of the foaming process without adverse decomposition or other effects, it is considered acceptable filler. As will be shown in the examples below, the presence of fillers in combination with the particular properties imparted to the polymer foam by the process of the instant invention can, in fact, result in the production of parts or shapes which demonstrate exceptional mechanical properties, apparently, because of the unique morphology obtained when such fibrous fillers align with the struts of the individual foam cells.

In the case of polymers available as fine powders, it is, of course, not necessary to further grind the polymer prior to molding or shaping. Similarly, in the case of polymer shapes already in the form of induction molded, extruded or compression molded parts, it is not necessary to further compression mold or shape the part prior to consolidation. In many instances, when the polymer part is obtained as an induction molded or compression molded part, additional consolidation is not necessary. Consolidation is only required in those instances where the polymer shape may not be in a continuous phase. In this case it is necessary to heat the part up to at least the softening point of the polymer and to apply pressure adequate to assure that a continuous phase with minimal porosity and air content is formed. Since the conditions necessary to achieve such a state will vary significantly from polymer to polymer, it is difficult to place any meaningful limitations on this process step, however these conditions are readily determinable by or known to the skilled artisan for any particular polymer composition.

If compression molding of a powdered polymer prior to consolidation is required, molding at pressures above about 7500 psi and preferably above about 12,000 psi have been found satisfactory in most cases.

The foaming process of the present invention is performed in a high pressure reactor or vessel at elevated temperature to increase the solubility of the gas in the polymer. Gas saturation is achieved by raising the temperature of the polymer to about its melting or softening point in an atmosphere of an inert gas such as helium, nitrogen, $CO_2$, argon, etc. under a pressure above about 800 psi, and preferably above about 1000 psi, and most preferably above about 3000 psi, and holding these conditions for a period of from about 10 minutes up to about 1 hour, and preferably from about 15–45 minutes. Saturation pressures up to about 10,000 psi have produced useful results, however, the use of soaking pressures above this level are entirely possible. Heat up should be at a rate of between about 1° C./min and about 10° C./min. The particular holding time, temperature and pressure will of course vary according to the particular polymer being processed, the gas being used and the cell size and density wished to be obtained. For example, for liquid crystal polymers the temperature will be above 380° C. while for polyphenylene sulfide polymers, the temperature will be above about 310° C. Soak time is generally dependent upon the thickness of the part or shape being processed, it being necessary for the foaming gas to penetrate and dissolve in the polymer all of the way to the center of the part or shape to obtain a homogeneous structure. Thus, although the soak time is preferably between about 15 and about 45 minutes, longer saturation times may be necessary for larger, i.e. thicker, parts and the use of such extended soak times for such larger parts is clearly contemplated herein.

After soaking for the appropriate amount of time and at the appropriate pressure, depending upon the particular polymer and part being treated, one of two quenching procedures may be utilized to complete the processing, depending upon of the structure wished to be achieved in the final product.

According to the first quenching option, after soaking is complete, the high pressure is released, preferably rapidly, and the polymer shape is quenched rapidly to a temperature below its $T_g$ using a fluid like pressurized gas. Once the temperature falls below the $T_g$ of the polymer, flow of the quenching fluid may be halted. The use of this option yields a low density open or closed cell microcellular foam.

According to the second quenching option, after soaking is complete, the pressure is partially released and the polymer shape allowed to cool below the $T_g$ of the polymer, whereupon the pressure is released. Preferably, this latter pressure release is accomplished rapidly by simply venting the soaking vessel to ambient. In this case, a high density, closed cell polymer foam is produced. Partial release of the soaking pressure is meant to refer to any pressure below that at which soaking occurs. The magnitude of the pressure release will be determined by the cell size to be obtained, it being intended that the pressure release serves to permit the dissolved gas to expand and the pressure reduction serves to control the amount and rate at which gas expansion can occur in the polymer. Similarly, although rapid release of pressure is preferred, slower release is permissible depending upon the nature of the foam sought to be manufactured.

The above process does not use a nucleating agent and, hence, may be characterized as a homogeneous nucleation process. It is, however, possible to blend a nucleating agent such as talc with the polymer before compression forming of the polymer shape or part, if this is deemed desirable.

The principle operating variables that determine the nucleation rate, and hence the cell density, are the applied soaking or saturation pressure, the gas solubility in the particular polymer being processed and the quench rate as described above. Any of these variables may be adjusted to meet a specific material requirement.

Specific processing parameters for specific polymeric materials are set forth in the following examples which provide the guidance necessary for the skilled artisan to achieve the desired result with any suitable polymer within the process guidelines described hereinabove.

Because of the high compressive strengths demonstrated by the foams and composites of the present invention, they are particularly useful in composite structures of the type which utilize a foamed polymer as the core of a metal, or otherwise skinned laminate. A lack of adequate compressive strength, thermal stability and fracture toughness have been particular shortcomings of prior art such materials. The enhanced compressive strengths of the foams of the present invention make them ideal candidates for such applications.

EXAMPLES

Example 1

Figure 2:
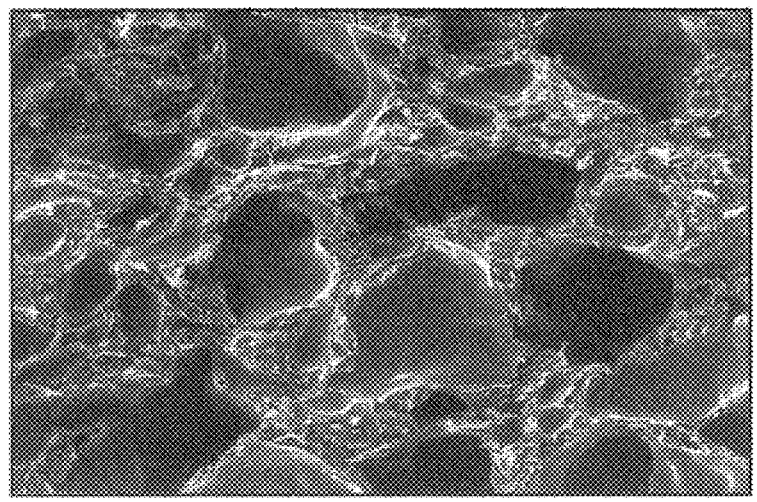
FIG. 2 is an SEM photomicrograph of an unfilled liquid crystal polymer foam made by the process of the present invention.
Figure 4:
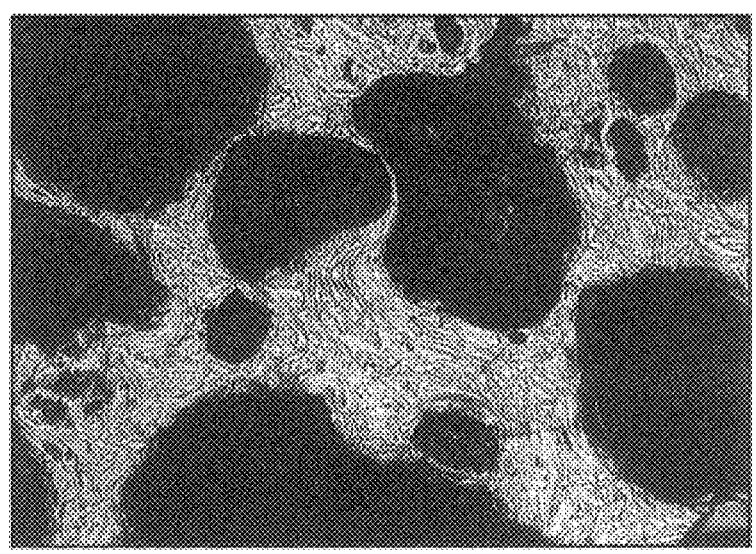
FIG. 4 is an SEM photomicrograph of an unfilled liquid crystal polymer foam made by the process of the present invention. This SEM photomicrograph shows that the crystals are aligned along the bubble surfaces and struts.

Samples of Xydar SRT-900, a liquid crystal polymer available for Amoco Chemical Corp. 4500 McGinnis Rd., Alpharettat, Ga. 30202, a powder, were compression molded into a discs 2.26" in diameter and 0.12" at about 1000 psi. Saturation was performed in the same pressure vessel/die combination as consolidation with nitrogen gas at a pressure of 3000 to 4200 psi, a temperature of from about 380 to about 400° C. and for a period for 20 to 50 minutes. Quenching was accomplished by injecting compressed air into the vessel. The resulting foams had the structure shown in the SEM of FIG. 2. After foaming, the samples had expanded to a thickness of 0.42" while the diameter remained essentially the same due to the constraints of the die in which the foaming was performed. The stress-strain capabilities of one of these samples are shown as curve 1 in FIG. 3. Mounting of a sample on an adhesive block followed by polishing with 220 grit sandpaper and diamond based polishing compounds, according to conventional practice, and finally etching with a colloidal silica suspension that etched the foam surface differentially between the crystals and the interface between the crystalline laminae produced the SEM shown in FIG. 4. As can be seen from an examination of FIG. 4, the crystals have aligned along the bubble walls.

Example 2

Figure 5:
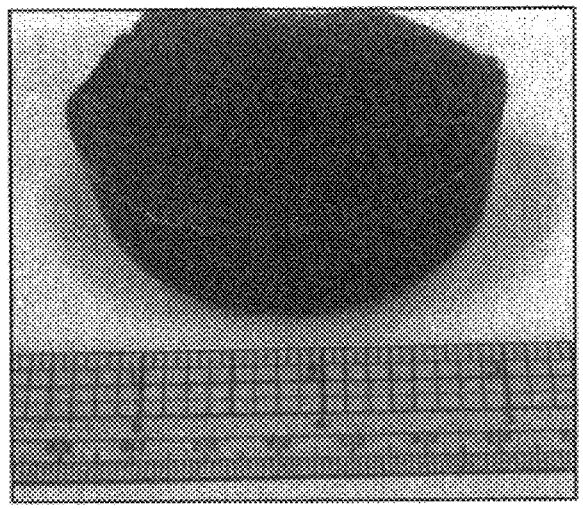
FIG. 5 is an SEM photomicrograph of a liquid crystal polymer foam filled with glass fibers made by the process of the present invention.
Figure 6:
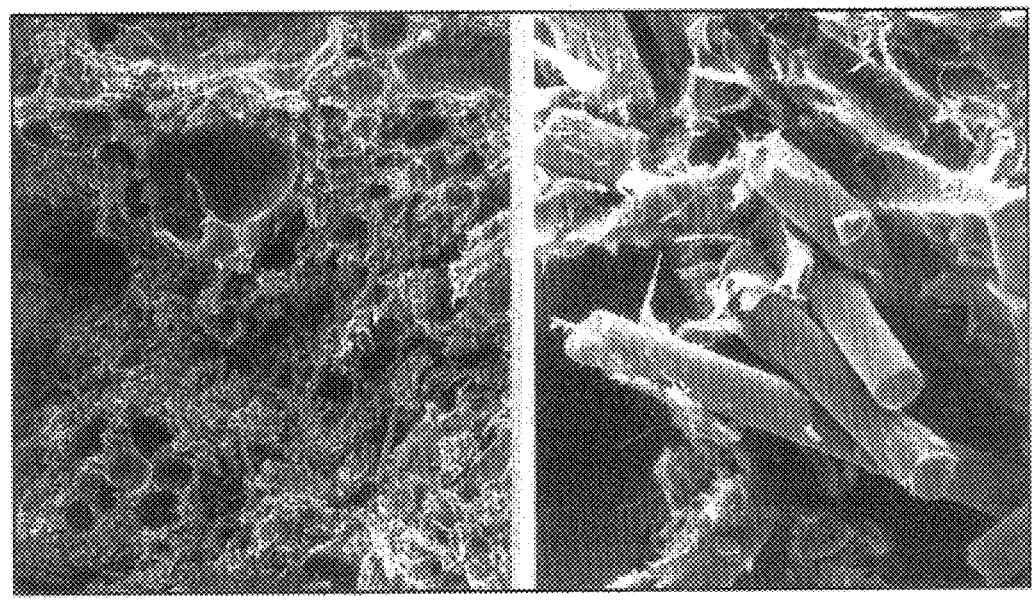
FIG. 6 is an SEM photomicrograph of a liquid crystal polymer foam filled with 30% by weight of chopped glass fibers made by the process of the present invention. In this embodiment, the fibers are aligned along the struts of the foam.

Chopped glass fibers identified as 165A11C obtained from Owens Corning, One Owens Corning Parkway, Toledo, Ohio 43659 were blended with Xydar SRT-900 using a blender. Material blends of approximately 15 and 30% fiber by weight were prepared. The polymer blends were then compression molded in a die as described above to form discs approximately 2.256" in diameter and about 0.15" thick. The glass filled polymer discs were then foamed as described in Example 1 above. One 15% loaded disc swelled to about 0.39", a second 15% loaded disc swelled to 0.40", and the 30% loaded disc swelled to 0.19" after foaming. The structure of samples of 15% loaded material is shown in the SEM of FIG. 5 and a 30% loaded material is shown in FIG. 6.

Figure 3:
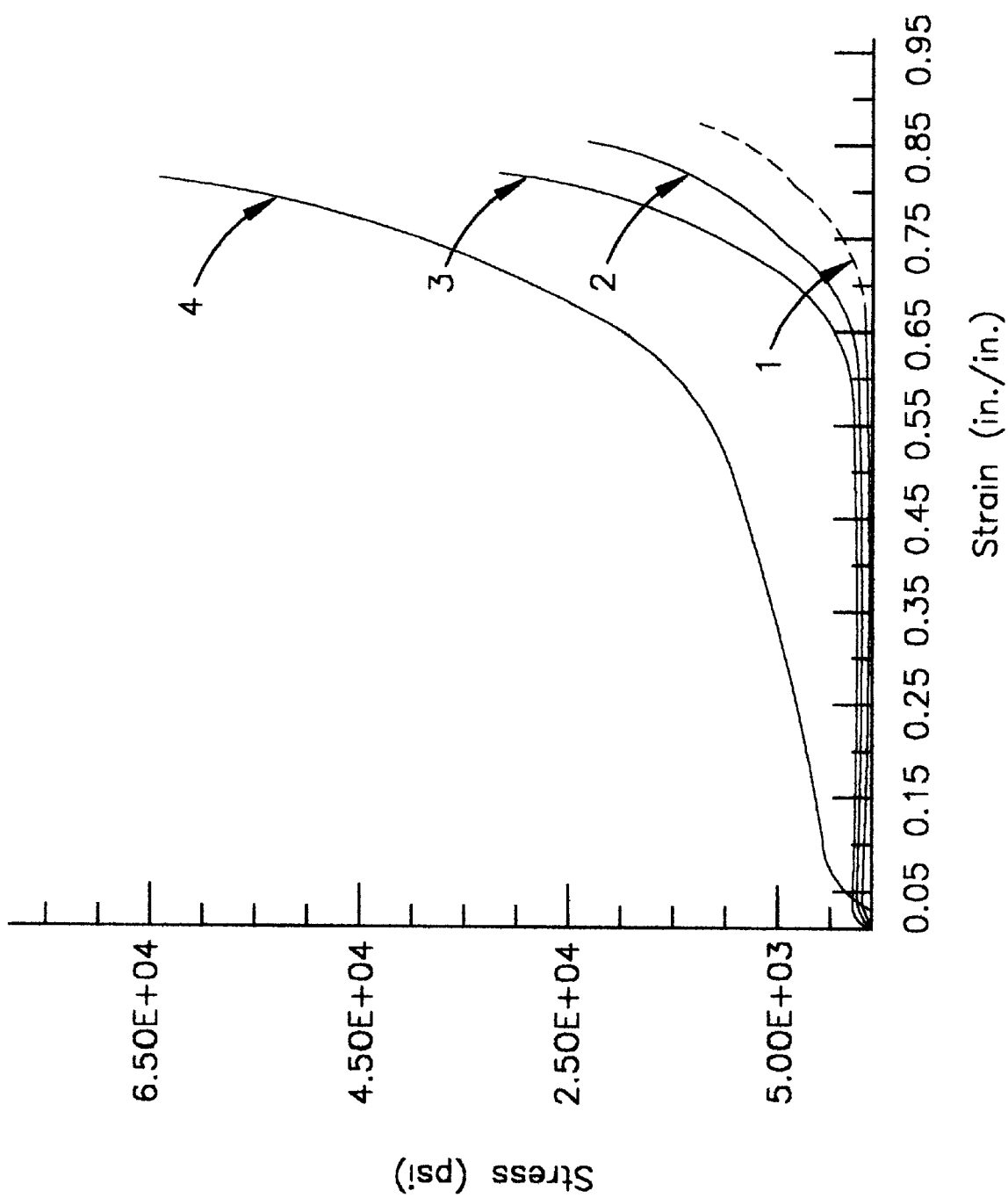
FIG. 3 is a graph showing the compression stress-strain relationships of filled and unfilled liquid crystal polymer foams made by the process of the present invention.

The compression strain relationships of these materials are shown as samples 2 (15% loaded), 3 also 15% loaded but compression formed twice instead of once as with sample 2, and 4 (30% loaded) in FIG. 3. It should be noted that the reinforcing fibers are aligned about the bubble walls, i.e. in alignment with the struts.

Example 3

Polyphenylene sulfide supplied by Hoechst-Celanese, 90 Morris Ave., Summit, N.J. 07901, as Fortron® 0205B4 available as a fine powder was compression molded into discs about 2.25" in diameter and 0.16" thick by subjecting them to a pressure of 12,000 psi. Saturation of the compression molded discs was performed at a temperature of from about 300 to about 350° C., and a pressure of 3500 psi for a period of from about 20 to about 40 minutes under a nitrogen atmosphere. The bubble sizes ranged from about 30 to about 120 μm in diameter. The compression load deformation relationship of these materials shows that this material fails at 13.4% average strain while the solid counterparts of this material fails at 3–6%. The compression strength of these foams is 1945 psi, 1190 psi and 824 psi along the x, y, and z axes, respectively.

30% chopped glass loaded samples of Fortron® were prepared in the same fashion as just described for the unfilled foams, except that glass fibers were blended in as described n Example 2. The bubbles in this material were about 40 μm in diameter. The compression strength of this material was 1188 psi, 3198 psi and 2979 psi along the x, y, and z axes, respectively.

Example 4

Polycarbonate sheets in thicknesses ranging from about 0.03 to about 0.125" (i.e. in consolidated form) supplied as Lexan® 9034 and Lexan® 141 by General Electric Plastics, One Plastics Ave, Pittsfield, Mass. 12001 were cut into 1" squares and foamed at temperatures above about 149° C. at a pressure of between about 4000 and 5100 psi for from about 10 to about 50 minutes. The cell size of foams thus produced was in the range of about 20 μm.

Example 5

Poly(etherketoneketone) having a melting point of 310–350° C., a softening point of 160° C., a decomposition temperature of 400° C., a specific gravity <1, insoluble in water, containing 0.7% volatiles and supplied as a powder by Cytec Fiberite, 400 Bellevue Rd., Newark, Del. 19713 was compression molded into discs 2.26" in diameter and from 0.10 to 0.15" thick. The discs were then heated to their melting point and held in a pressure vessel under nitrogen atmosphere at 3000 to 4000 psi for a period of 45 minutes. The microcellular foams thus produced, have a modulus of 27.2 ksi for a foam density of 0.311 g/cc as compared to an initial unfoamed modulus of 23.15 ksi. It is interesting to note that after compression loading to 90% strain (25~50 KSI) the foam specimens can still carry additional load.

From the foregoing description, one skilled in the art can easily ascertain the essential characteristics of this invention, and without departing from the spirit and scope thereof, make various changes and modifications to the invention to adapt it to various usages and conditions. It is therefore intended that the scope of the invention is limited only by the scope of the appended claims.

What is claimed is:

1. A process for the production of microcellular polymer foam shape comprising:
    a) saturating a consolidated polymer shape with an inert gas at an elevated pressure above 800 psi and at a temperature above the glass transition temperature of the polymer;
    b) full or partially releasing the pressure; and
    c) quenching the polymer shape to a temperature below the glass transition temperature of the polymer at a rate sufficient to produce a polymeric microcellular crystalline foam comprised of bubbles having walls wherein the crystals are aligned within the walls of the bubbles.

2. The process of claim 1 wherein said quenching is performed by rapidly reducing the temperature of the polymer shape to below the glass transition temperature of the polymer after reducing the elevated pressure suddenly to ambient.

3. The process of claim 1 wherein said quenching is performed by partially reducing said elevated pressure, cooling said polymer shape to a temperature below the glass transition temperature of said polymer, and reducing the pressure to ambient.

4. The process of claim 1 wherein saturating is performed at a pressure above about 1000 psi.

5. The process of claim 1 wherein said inert gas is selected from the group consisting of nitrogen, argon, helium, and carbon dioxide.

6. The process of claim 1 said polymer shape is consolidated prior to saturating by heating said polymer to its softening point under pressure adequate to form a continuous phase.

7. A microcellular polymer foam shape produced by a process comprising:
   a) saturating a consolidated shape of a polymer to be foamed with an inert gas at an elevated pressure above 800 psi and at a temperature above the glass transition temperature of said polymer;
   b) fully or partially releasing the pressure; and
   c) quenching said polymer shape to a temperature below the glass transition temperature of the polymer at a rate sufficient to produce a polymeric microcellular crystalline foam comprised of bubbles having walls wherein the crystals are aligned within the walls of the bubbles.

8. The microcellular polymer foam shape of claim 7 wherein said quenching is performed by reducing the temperature of the polymer shape to below the glass transition temperature of the polymer while partially maintaining said elevated pressure in an inert atmosphere.

9. The microcellular polymer foam shape of claim 7 wherein said quenching is performed by rapidly reducing the temperature of the polymer shape to below the glass transition temperature of the polymer after rapidly reducing said elevated pressure to ambient.

10. The microcellular polymer foam shape of claim 7 wherein said wherein saturating is performed at a pressure above 1000 psi.

11. The microcellular polymer foam shape of claim 7 wherein said inert gas is selected from the group consisting of nitrogen, argon, helium, and carbon dioxide.

12. The microcellular polymer foam shape of claim 7 wherein said polymer shape is consolidated prior to saturating by heating said polymer to its softening point and compression molding under a pressure adequate to form a continuous phase.

13. The microcellular polymer foam shape of claim 7 wherein said polymer shape comprises up to about 50 weight percent of a filler selected from the group consisting of chopped glass fibers, carbon fibers, metallic fibers and powders, aramid fibers, ceramic whiskers, ceramic fibers and powders, and organic fibers and powders.

14. Polymeric microcellular crystalline foams comprised of bubbles having walls wherein the crystals are aligned within the walls of the bubbles.

15. Polymeric microcelluar foams comprised of bubbles having walls and loaded with an fibrous filler comprised of fibers wherein the fibers of the fibrous filler are aligned within the walls of the bubbles.

* * * * *